US005361853A

United States Patent [19]

Takamura et al.

[11] Patent Number: 5,361,853

[45] Date of Patent: Nov. 8, 1994

[54] POWER TOOL

[75] Inventors: Akio Takamura; Hideto Yagi; Takao Yokota, all of Fuchu, Japan

[73] Assignee: Ryobi Limited, Tokyo, Japan

[21] Appl. No.: 981,600

[22] Filed: Nov. 25, 1992

[30] Foreign Application Priority Data

Nov. 29, 1991 [JP] Japan .............................. 3-098701[U]
Nov. 29, 1991 [JP] Japan .............................. 3-098702[U]
Nov. 29, 1991 [JP] Japan .............................. 3-098703[U]

[51] Int. Cl.5 ......................... B25D 11/04; H02K 9/22
[52] U.S. Cl. .................................... 173/217; 173/117; 310/52; 310/90
[58] Field of Search ........................ 173/117, 217, 104; 310/52, 90

[56] References Cited

U.S. PATENT DOCUMENTS 3,824,684 7/1974 Wheeler ................................ 310/50
3,831,048 8/1974 Wagner .................................. 310/90
5,006,740 4/1991 Palm ...................................... 310/52

*Primary Examiner*—Scott A. Smith
*Attorney, Agent, or Firm*—Brooks & Kushman

[57] ABSTRACT

A power tool comprises an outer casing, a drive motor disposed in the casing for driving a tool member, a drive shaft extending from the drive motor, an electric element of operating the drive motor, a heat radiating block secured to the drive motor, a power control element secured to the heat radiating block for controlling a rotation number of the drive motor, and a mechanism for preventing a rotation of the drive motor in engagement of the heat radiating block with the outer casing. The rotation preventing mechanism comprises an engaging member integrally formed to the heat radiating block and a member formed to the casing to be engageable with the engaging member. The power tool further comprises a speed reduction mechanism connected to the drive motor for reducing the driving speed of the drive motor and a rotation transmitting mechanism operatively connected to the speed reduction mechanism for transmitting the rotation of the drive motor to the tool member. The speed reduction mechanism includes a rotating portion having a pinion and the rotation transmitting mechanism includes a shaft having one end connected to the rotating portion of the speed reduction mechanism and another end connected to the tool member, the one end of the shaft being provided with a hole into which said rotating portion is rotatably inserted.

5 Claims, 9 Drawing Sheets

POWER TOOL

BACKGROUND OF THE INVENTION

This invention relates to a power tool operable at a variable driving speed and including a heat radiating block provided for a driving mechanism and a speed reduction mechanism which have improved structures.

In general, there is known a power tool such as an impact driver or an impact wrench for performing an automatic screw clamping operation. When it is required to clamp a screw by using such a power tool, the power tool is first driven at a low speed for positioning for the screw clamping and then driven at a high speed after the positioning for the screw clamping. In a case where the impact driver is utilized, the revolution numbers of a motor of the impact driver is changed by utilizing a power control element.

In such usage of the power control element, however, there causes a heat generation, which may result in heat breakage of the power control element itself, and in order to obviate such fear, in prior art, the power control element is attached to a heat radiating block thereby to escape the heat of the power control element to prevent the breakage thereof due to the generated heat.

In the structure of the power tool provided with the additionally incorporated heat radiating block, it is necessary to preliminarily set a space for locating the heat radiating block in the power tool, resulting in an enlargement of the power tool itself.

Furthermore, in a general power tool including a motor, a motor shaft is constructed so as to have a cantilevered beam structure, so that there is a fear of the motor shaft being deflected. In a case when such deflection is caused, mutual engagement of gears as a speed reduction mechanism disposed in the power tool is made worse and abnormal noises may be generated. In a certain case, abrasion may be caused between the gears, thus deteriorating the durability of the gears.

Moreover, in the general power tool, since the motor shaft is integrally formed with a carrier member constituting a power transmission mechanism, it is necessary to produce the shaft from a material, by cutting the same, having a diameter larger than an outer diameter of the carrier member or to produce the shaft by first carrying out a forging step with dimensions necessary for the carrier member and then cutting off unnecessary portion therefrom. Such working is troublesome for the manufacture of the shaft, requiring much time and labour in addition to a problem of bad yielding with respect to the material.

Still furthermore, the prior art provides a problem in an assembling process such that a pin is press fitted into pin holes of the carrier member, a planetary gear and a further carrier member, respectively, and such fitting requires an exact alignment of these pin holes, thus providing difficulty in the assembling of these members.

SUMMARY OF THE INVENTION

An object of this invention is to substantially eliminate defects or drawbacks encountered in the prior art described above and to provide a power tool provided with a heat radiating block without enlarging the entire structure of the power tool itself and capable of giving a function for preventing motor rotation to the heat radiating block.

Another object of this invention is to provide a power tool capable of reducing deflection of a motor shaft thereby to reduce noises of gears, thus improving durability of the gears.

A further object of this invention is to provide a power tool which can be easily assembled with parts easily manufactured.

These and other objects can be achieved according to this invention by providing in one aspect a power tool, which comprises:

an outer casing constituting an outer structure of a power tool;

a rotation drive means disposed in the casing for driving a tool member, the rotation drive means including a drive shaft through which the tool member is attached to the rotation drive means;

an operating means disposed in the casing for operating the rotation drive means;

a heat radiating block secured to the rotation drive means;

a power control means secured to the heat radiating block for controlling a rotation number of the rotation drive means; and a mechanism for preventing a rotation of the rotation drive means in engagement of the heat radiating block with the outer casing.

In a preferred embodiment, the rotation preventing mechanism comprises at least one projecting portion integrally formed to the heat radiating block and at least one engaging portion formed to an inner wall of the casing so as to have a shape to be engageable with the projecting portion, the projecting portion abutting against the rotation drive means, and in a modification, the rotation preventing mechanism comprises a protruded portion formed to an outer peripheral side portion of the heat radiating block and a recessed portion formed to an inner wall of the casing so as to have a shape to be engageable with the protruded portion.

According to this aspect of this invention, the heat radiating block is provided with the mechanism for preventing the drive means such as a motor from rotating in association with the stationary outer casing, the rotation of the drive means can be precisely prevented. The integrally formation of such rotation preventing mechanism to the heat radiating block can eliminate an additional independent location of such mechanism, thus achieving space advantage and making the structure of the power tool compact. In addition, the heat radiating block is disposed in front of the motor, thus further enhancing the space advantage.

In another aspect of this invention, there is provided a power tool, which comprises:

an outer casing constituting an outer structure of a power tool a rotation drive means disposed in the casing for driving a tool member, a rotation of the rotation drive means is transmitted to a tool member through a drive shaft connected to the rotation drive means;

an operating means disposed in the casing for operating the rotation drive means;

a speed reduction mechanism operatively connected to the rotation drive means for reducing the driving speed of the drive means; and a rotation transmitting mechanism operatively connected to the speed reduction mechanism for transmitting the rotation of the drive means to the tool member, wherein the speed reduction mechanism is provided for the drive shaft and includes a rotating portion having a pinion and the rotation transmitting mechanism includes a shaft member having one end connected to the rotating portion of the speed reduction mechanism and another end connected to the tool member, the one end of the shaft member being provided with a hole into which the rotating portion is rotatably inserted.

In a preferred embodiment, the rotating portion comprises the drive shaft connected to the drive means and the pinion mounted to the drive shaft, the pinion having one end rotatably inserted into the hole of the shaft member. In a modified embodiment, the rotating portion comprises the drive shaft connected to the drive means and the pinion mounted to the drive shaft, the drive shaft having one end rotatably inserted into the hole of the shaft member. In another modified embodiment, the rotating portion comprises the drive shaft and the pinion integrally formed to the drive shaft as tooth portion, the drive shaft having one end rotatably inserted into the hole of the shaft member.

In this aspect, since the pinion constituting one member of a speed reduction mechanism is integrally provided for the rotating member of the drive means and fitted to the rotation transmitting mechanism, the rotation of the rotating member can be smoothly made and the noise caused by the gearing engagement can be minimumly reduced as well as good gearing condition can be performed, thus improving the durability of the gear members.

In a further aspect of this invention, there is provided a power tool, which comprises:

an outer casing constituting an outer structure of a power tool;

a rotation drive means disposed in the casing for driving a tool member, a rotation of the rotation drive means is transmitted to a tool member through a drive shaft connected to the rotation drive means;

an operating means disposed in the casing for operating the rotation drive means;

a speed reduction mechanism operatively connected to the rotation drive means for reducing the driving speed of the drive means; and a rotation transmitting mechanism operatively connected to the speed reduction mechanism for transmitting the rotation of the drive means to the tool member, wherein the speed reduction mechanism comprises a pinion mounted to the drive shaft, an internal gear secured to an inner wall of the casing, at least one planetary gear engaged with the pinion and the internal gear, and a carrier member connected to the planetary gear through a pin member and the rotation transmitting mechanism includes a shaft member having one end mounted to the carrier member and another end connected to the tool member.

In this aspect, the carrier member of the speed reduction mechanism is disposed independently from the shaft member of the rotation transmitting mechanism, so that these members can be made independently, thus being manufactured easily and precisely. Since the single carrier member and the planetary gear are coupled only through the pin, it is not necessary to clamp the planetary gear by carrier members disposed on both sides thereof, thus making compact the parts arrangement of the power tool.

The further natures and features of this invention will be made further clear from the following descriptions with reference to the accompanying drawings.

DESCRIPTION OF THE PREFERRED EMBODIMENTS

Figure 1:
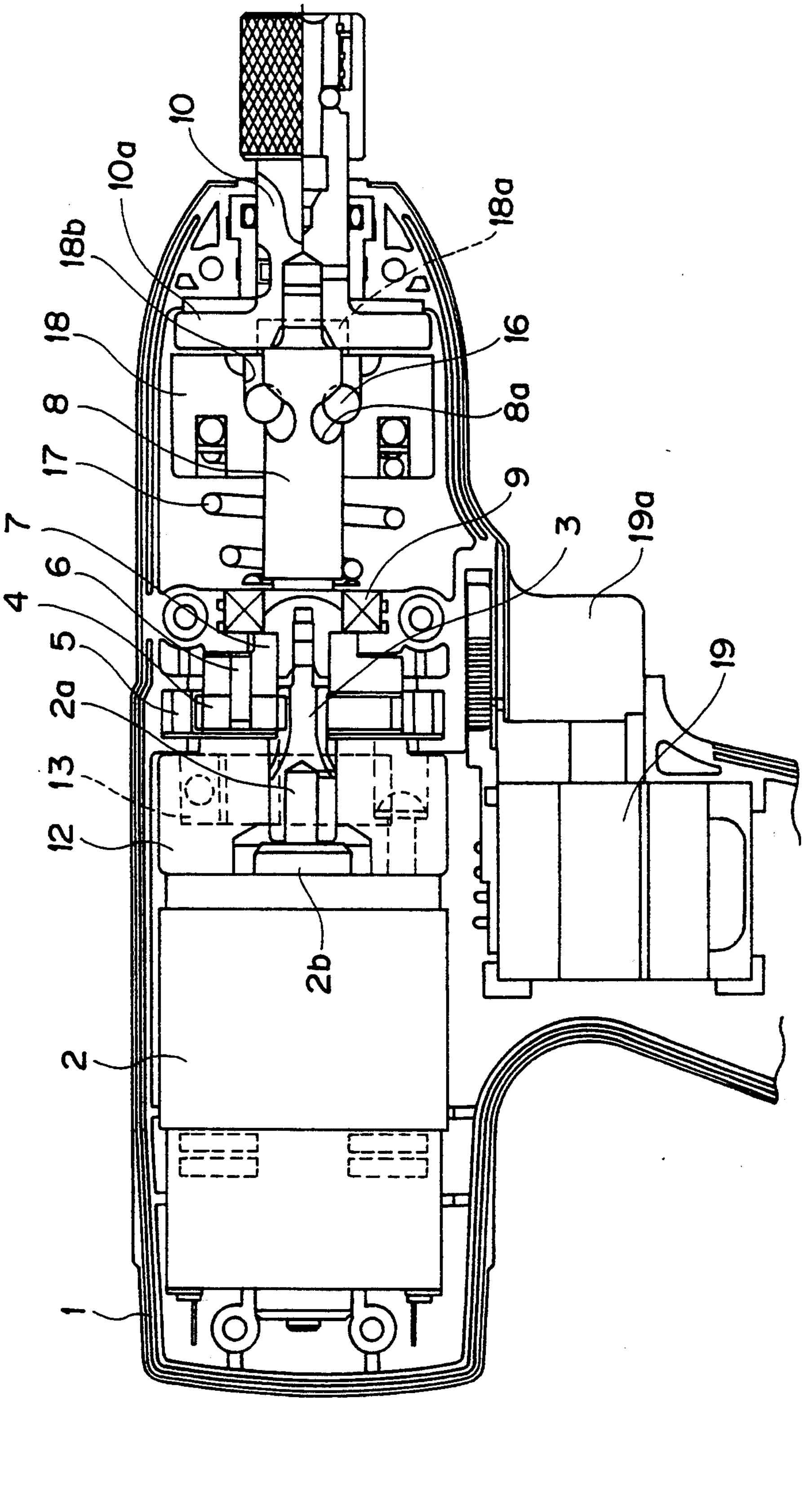
FIG. 1 is a longitudinal sectional view, partially broken away, of a first embodiment of a variable speed power tool according to this invention.

FIG. 1 is a longitudinal section of a power tool according to one embodiment of this invention. The power tool comprises a casing 1 generally composed of two halves constituting a body of the power tool and an electric motor 2 is disposed in the casing at a rear side portion thereof, lefthand as viewed, as a driving means. A motor shaft 2*a* from the motor 1, and a pinion 3 is mounted to the motor shaft 2*a*. To the pinion 3 is meshed with a planetary gear 4 which in turn is meshed with an internal gear 5 secured to the inner wall of the casing 1. A carrier member 7 is provided for the planetary gear 4 through a pin 6 and the carrier member 7 has a hole at substantially a central portion through which is inserted a shaft 8 at one end, lefthand end as viewed, which is supported by a bearing means 9. A bit holder 10 for holding a tool is disposed at a portion near the righthand, i.e. front, end for the shaft 8. An impact mechanism is arranged between the bit holder 10 and the bearing means 9 for transmitting the rotation power of the shaft 8 to the bit holder 10.

Namely, a cam groove 8*a* is formed to the front end portion of the shaft 8 and a hammer 18 is mounted to the front end portion of the shaft 8 so that the hammer 18 is always urged rightwardly by a spring member 17 which is also mounted to the shaft 8 at the lefthand portion of the hammer 18. The hammer 18 is provided with a cam groove 18*b*, and balls such as steel balls 16 are fitted into the cam groove 18*b* and the groove 8*a* of the shaft 8. A claw piece 18*a* is disposed at the righthand portion of the hammer 18 so as to be engageable with a claw member 10*a* of the bit holder 10. A heat radiating block 12 is disposed righthand portion of the motor 2 and an electric control element 13 is provided for the heat radiating block 12 for controlling the revolution numbers of the motor 2.

Figure 2:
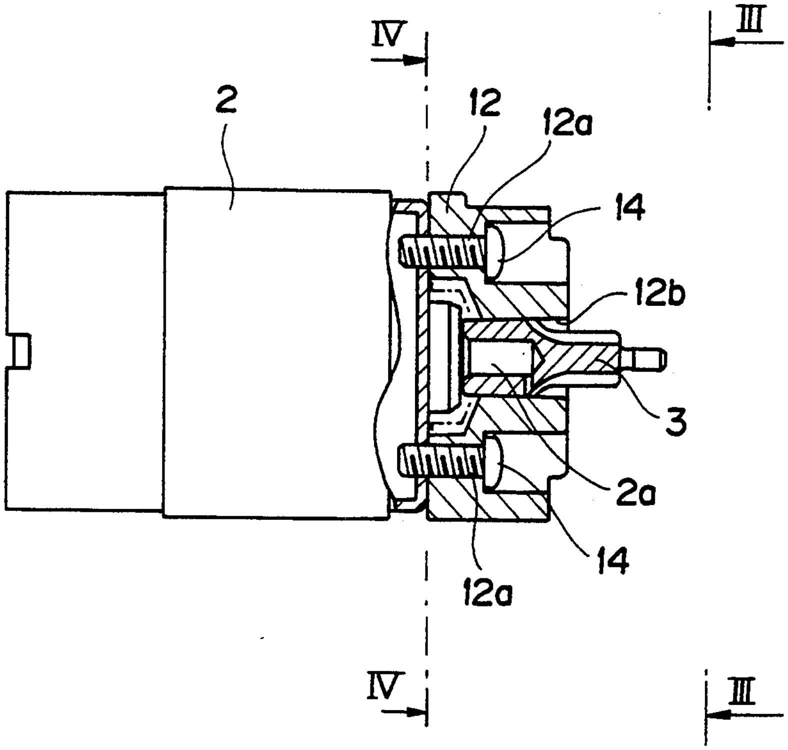
FIG. 2 is a view showing an attached condition of a heat radiating block to a motor of the power tool of FIG. 1.
Figure 3:
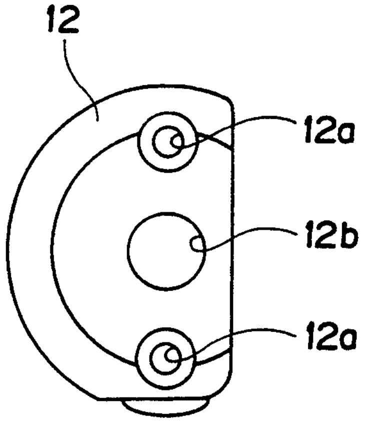
FIG. 3 is a schematic view shown from an arrowed direction III—III of FIG. 2.
Figure 4:
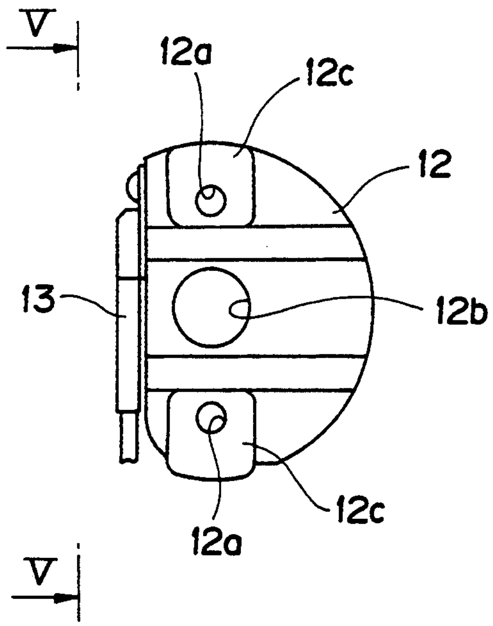
FIG. 4 is a view shown from an arrowed direction IV—IV of FIG. 2, but only showing the heat radiating block.
Figure 5:
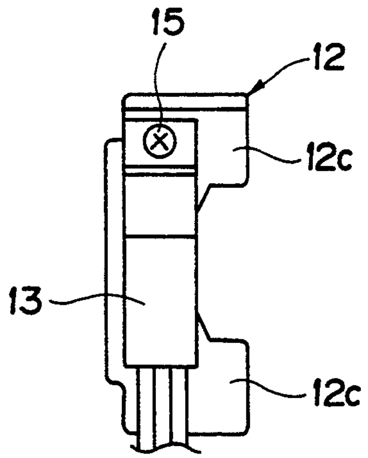
FIG. 5 is a view shown from an arrowed direction V—V of FIG. 4, but only showing the heat radiating block.

FIG. 2 is a detailed view showing an attachment of the heat radiating block 12 to the motor 2. Namely, referring to FIG. 2, the heat radiating block 12 is provided with two threaded screw holes 12*a*, 12*a* and a hole 12*b*. Two leg pieces 12*c*, 12*c* are formed to the heat radiating block 12 at the lefthand side thereof as shown in FIG. 4. The heat radiating block 12 is fixed to the motor 2 by inserting the motor shaft 2*a* and the pinion 3 into the hole 12*b* of the heat radiating block 12 and also inserting screws 14, 14 into the screw holes 12*a*, 12*a*. This state is shown in FIG. 2. A power control element 13 is secured to the heat radiating block 12 by means of screw 15 as shown in FIG. 4 or FIG. 5.

Figure 6:
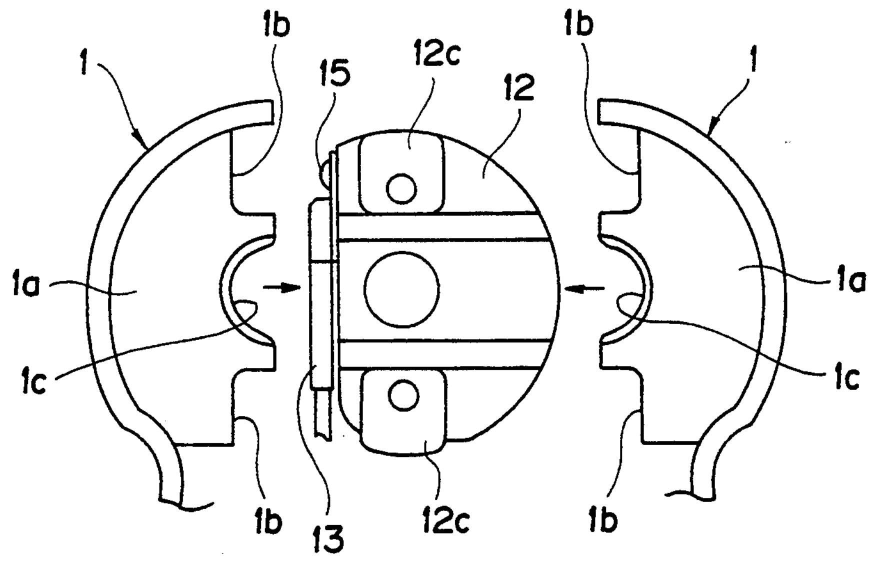
FIG. 6 is a developed illustration of a casing of the power tool before assembling the same.
Figure 7:
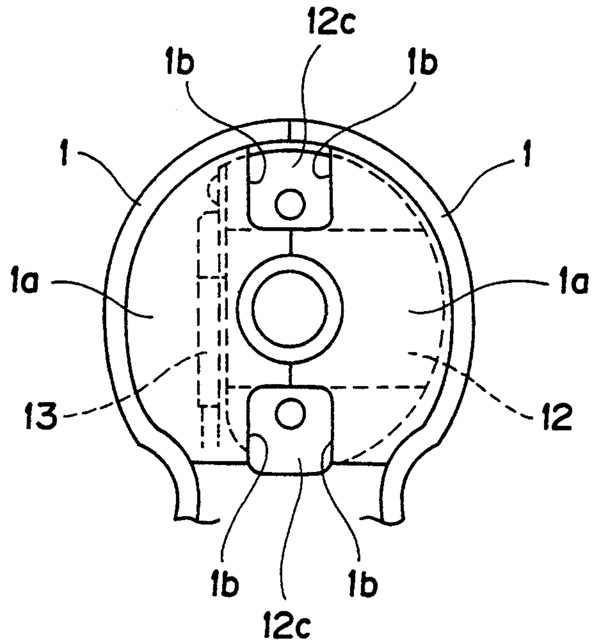
FIG. 7 is an illustration of the casing of the power tool after the assembling thereof.

FIG. 6 is a developed view for the explanatory of the assembling of the casing 1 composed of two halves in which ribs 1*a*, 1*a* are formed to the casing halves and one of the ribs 1*a*, 1*a* has two engaging portions 1*b*, 1*b* and the other one of the ribs 1*a*, 1*a* also has two engaging portions 1*b*, 1*b* opposing to the former ones, and these engaging portions 1*b*, 1*b*, 1*b*, 1*b* are formed to be engageable with the leg pieces 12*c*, 12*c*, respectively. The ribs 1*a*, 1*a* are provided with bearing support portions 1*c*, 1*c* opposing to each other for supporting the motor shaft bearing 2*b* when assembled. In the assembly, these two casing halves are moved in arrowed directions thereby to firmly couple the casing halves, whereby the outer casing 1 of the power tool according to this embodiment can be realized as shown in FIG. 7. In this assembly, the engaging portions 1*b*, 1*b*, 1*b*, 1*b* of the casing 1 are engaged with the leg pieces 12*c*, 12*c* secured to the heat radiating block 12 can be itself prevented and the rotation of the motor 2 is hence prevented. Thus, according to the present embodiment, the engaging portions 1*b* and the leg pieces 12*c* can constitute a rotation preventing means or mechanism for the heat radiating block of the power tool.

The motor 2 is operated by a switch means 19 disposed in the casing 1 at a portion, for example, below the motor as shown in FIG. 1 in an operative association.

In the power tool of the structure described above, a control circuit is accommodated in the switch means 19 and the control circuit transmits a control signal to the power control element 13 mounted on heat radiating block 12 in response to a triggering of a switch trigger 19*a*, which is generally operated by a hand or finger of an operator. In response to the control signal, the ON-OFF time rate of the power control element 13 is changed and the revolution number of the motor 2 is hence changed. Heat generated to the control element 13 during the controlling operation escapes to the heat radiating block 12. Further, since the heat radiating block 12 is prevented from rotating by the engagement with the casing 1, so that the rotation of the motor 2 itself can be also prevented.

In accordance with the driving of the motor 2, the motor shaft 2*a* is rotated through which the pinion 3 mounted on the motor shaft 2*a* is also rotated. When the pinion 3 is rotated, the planetary gear 4*a* is revolved, and as the planetary gear 4 is engaged also with the internal gear 5 mounted to the casing 1, the planetary gear 4 can be rotated around the pinion 3 while revolving. This rotation is transmitted to the carrier member 7 and the shaft 8 through the pin 6. The rotation of the shaft 8 is transmitted to the hammer 18 through the steel balls 16 fitted in the cam grooves 18*b* and 8*a*, thus the hammer 18 being rotated. The hammer 18 moves leftwardly, as viewed in FIG. 1, in engagement with the cam grooves 18*b* and 8*a* upon reaching a predetermined clamping torque, whereby the engagement between the claw piece 18*a* of the hammer 18 and the claw member 10*a* of the bit holder 10 can be released. At this moment, the spring urging force of the spring member 17 increases by the displacement of the hammer 18 and the rotating force of the hammer is increased, thus the hammer 18 being moved rightwardly as viewed in FIG. 1 and the hammer 18 strikes the claw member 10*a* of the bit holder 10 and engages the same. In thus manner, the bit holder 10 is rotated thereby to perform the screw fastening or loosening operation.

Figure 8:
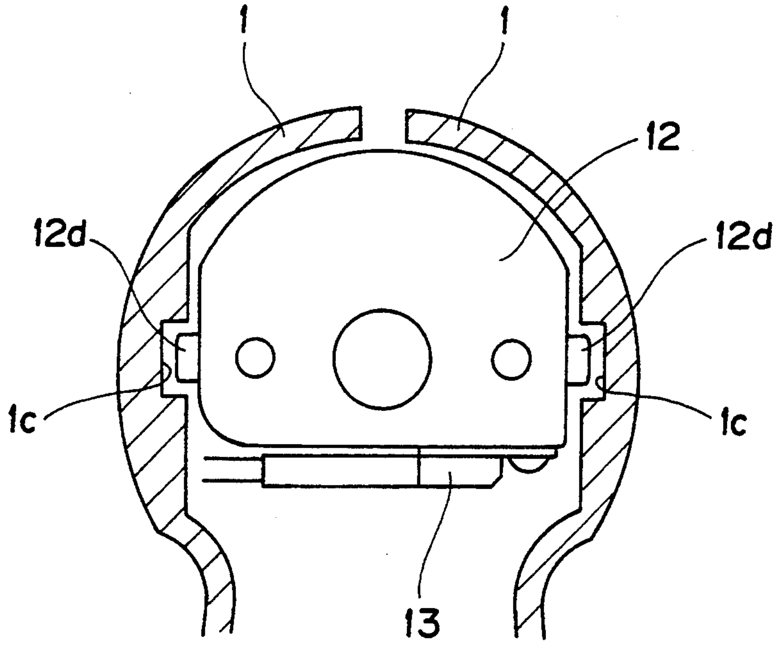
FIG. 8 is a view of another example of a structure for preventing the rotation of the heat radiating block.

FIG. 8 represents a modification of another structure for preventing the rotation of the heat radiating block. In this modification, projections 12*d* are provided for the heat radiating block 12 in place of the leg pieces 12*c* in the former embodiment so as to project in the radial directions, and recessed portions 1*d* are formed to the casing halves of the casing 1, respectively. Further, the recessed portions have a shape engageable with the projections 12*d* when the casing halves are assembled, whereby the rotation of the heat radiating block 12 can be prevented and the motor 2 is hence prevented from rotating.

In the described embodiment, heat transfer from the motor 2 to the heat radiating block 12 may be further suppressed by locating a heat insulating material such as mica or plastic material at a contacting portion between where a fan is incorporated in the motor 2, In a case where a fan is incorporated in the motor 2, the heat radiating effect can be enhanced by providing a wind hole to the casing 1 so that wind collides with the heat radiating block 12 and the power control element 13 and further improved by designing the heat radiating block 12 so as not to close a wind hole of the motor 2.

Figure 9:
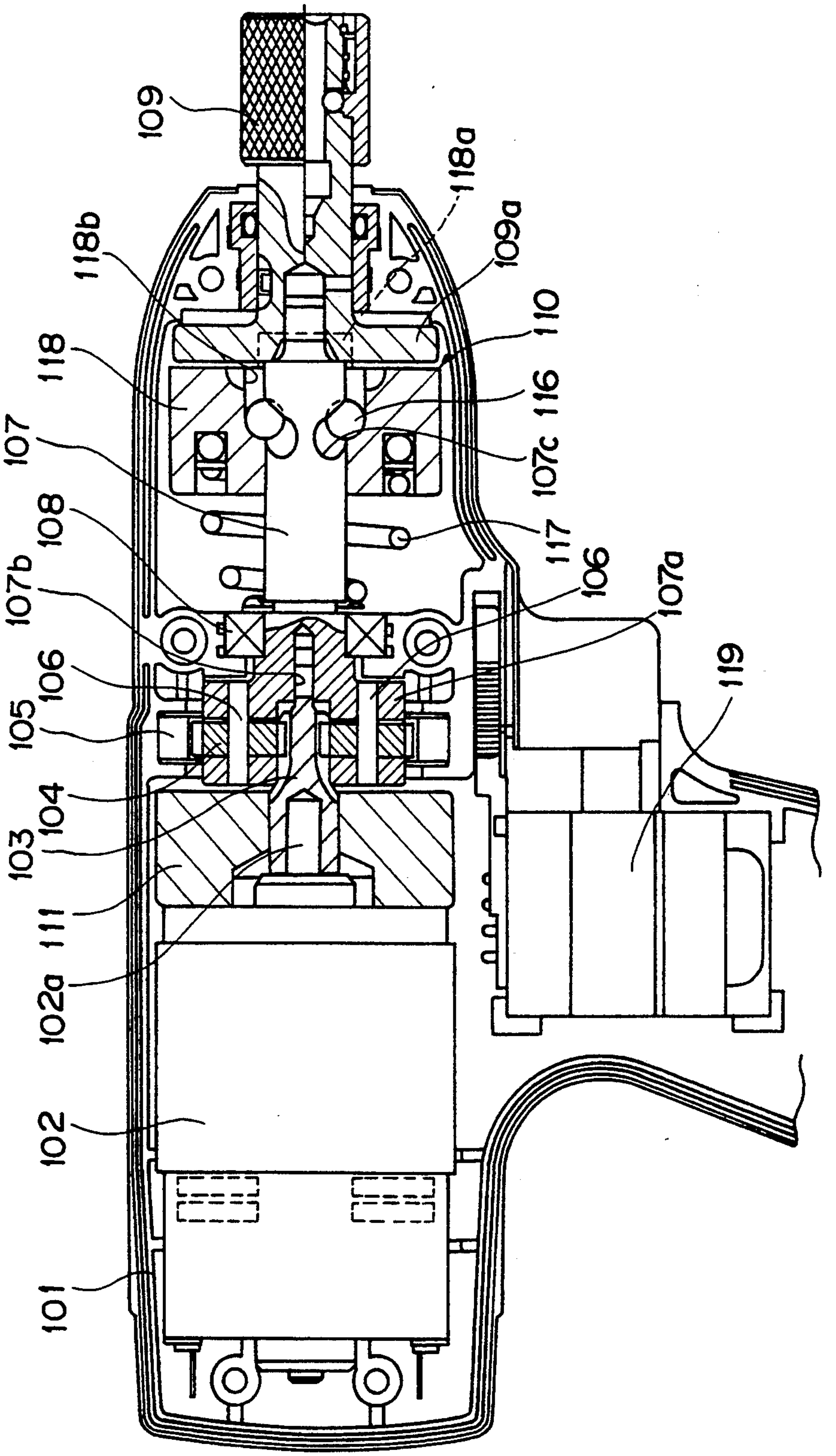
FIG. 9 is a longitudinal sectional view showing a second embodiment of this invention.

FIG. 9 is view similar to that of FIG.1 and showing a second embodiment of the power tool according to this invention.

Referring to FIG. 9, reference numeral 101 denotes a tool casing composed of two casing halves and an electric motor 102 is disposed in the casing at a rear side portion thereof, lefthand as viewed, as a driving means. A motor shaft 102*a* extends rightward, i.e. towards the front side of the casing 101, from the motor 102, and a small pinion 103 is mounted to the motor shaft 102*a*. The adoption of the small sized pinion 103 can make compact the power tool itself. To the pinion 103 are meshed with planetary gears 104, 104 which are mounted through pins 106, 106 to a carrier member 107*a* of a shaft 107, as a rotating member, rotatably supported by a bearing means 108. The base end, righthand end as viewed, of the shaft 107 is provided with a hole 107*b* into which the front end of the pinion 103 is inserted is constituted by the pinion 103, the planetary gears 104, 104, the internal gear 105, and the pins 106, 106.

A bit holder 109 for holding a tool is disposed at a portion near the righthand, i.e. front, end of the shaft 107. An impact mechanism 110 is arranged between the bit holder 109 and the bearing means 108 for transmitting the rotation power of the shaft 107 to the bit holder 109.

Namely, a cam groove 107c is formed to the front end portion of the shaft 107 and a hammer 118 is mounted to the front end portion of the shaft 107 so that the hammer 118 is always urged rightwardly by a spring member 117 which is also mounted to the shaft 107 at the lefthand portion of the hammer 118. The hammer 118 is provided with cam groove 118b, and the cam groove 107c of the shaft 107. A claw piece 118a is disposed at the righthand portion of the hammer 118 so as to be detachably engageable with a claw member 109a of the bit holder 109. Thus, a rotation transmitting mechanism is constituted by the shaft 107, the steel balls 116, 116 and the hammer 118. A beat radiating block 111 is disposed righthand portion of the motor 102 and a power control element, not shown, is provided for the heat radiating block element, not shown, is provided for the heat radiating block 111 for controlling the revolution numbers of the motor 102.

The motor 102 is operated by a switch means 119 disposed in the casing 101 at a portion, for example, below the motor as shown in FIG. 9 in an operative association.

In the power tool of the structure described above, a control circuit is accommodated in the switch means 119 and the control circuit transmits a control signal to the power control element provided for the heat radiating block 111 by turning ON the switch means 119. The pinion 103 is then rotated, and in this operation, as the front end of the pinion 103 is inserted into the hole 107b formed to the base portion of the shaft 107, the deflection of the pinion 103 is decreased. The planetary gears 104, 104 are revolved in accordance with the rotation of the pinion 103 and rotated about the pinion while revolving by the engagement with the internal gear 105 secured to the inner wall of the casing 101. This rotation of the planetary gears is transmitted to the shaft 107 through the pins 106, 106 thereby to rotate the same.

In accordance with the rotation of the shaft 107, the hammer 118 is also rotated through the steel balls 116, 116. The hammer 118 is moved leftwardly as viewed in engagement with the cam grooves 118b and 107c upon reaching the predetermined fastening torque, and the engagement between the claw piece 118a and the claw member 109a of the bit holder 109 can be released. At this moment, the spring urging force of the spring 117 increases by the movement of the hammer 118 and the rotating force of the hammer 118 is hence increased, thus moving the hammer 118 rightwardly and striking the claw member 109a of the bit holder 109, whereby the bit holder 109 is rotated in a direction for fastening or loosening the screw.

In the described embodiment, the shaft 107 and the carrier member 107a are formed integrally, but these members are composed of independently.

Figure 10:
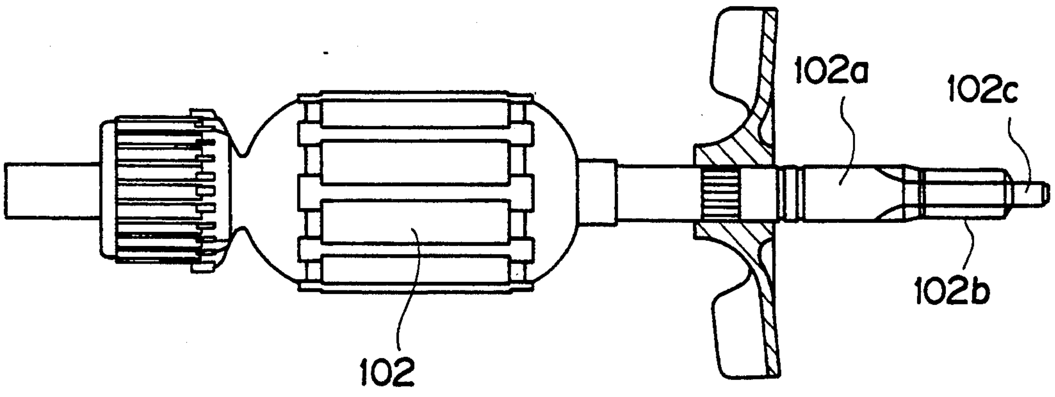
FIG. 10 is a motor shaft with a pinion of a modified embodiment of FIG. 9.

FIG. 10 shows a modified embodiment of FIG. 9, in which a pinion 102b is formed to the motor shaft 102a by cutting the outer surface of the shaft 102a in tooth shape. In this embodiment, a front end portion 102c of the motor shaft 102a is inserted into a hole of a shaft in a rotatable manner. According to this embodiment, an outer diameter of the pinion 102b is not made large, thus making compact the power tool itself.

Figure 11:
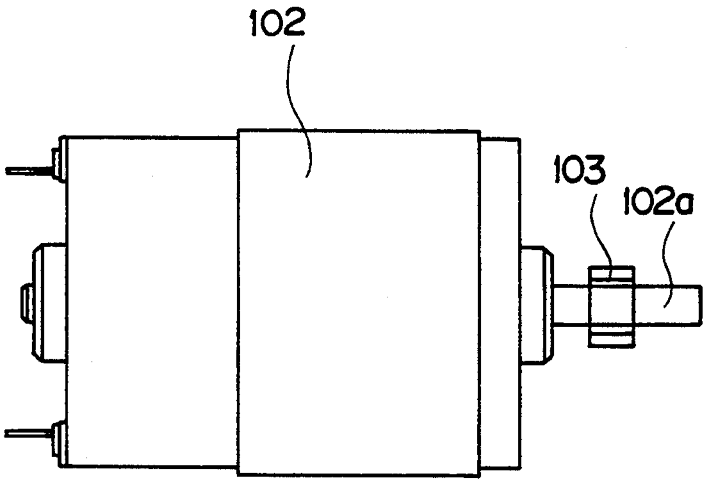
FIG. 11 shows a further modification of the embodiment of FIG. 9.

FIG. 11 further shows a modified embodiment, in which a pinion 103 having a relatively large diameter is incorporated. Namely, in this embodiment, it is possible to freely select the diameter of the pinion 103. In this embodiment, the front end of only the motor shaft 102a is inserted into a hole of a shaft, not shown, in a rotatable manner.

In this embodiment, the rotation preventing mechanism for preventing the rotation of the motor of the first embodiment may be applied to the heat radiating block.

Figure 13:
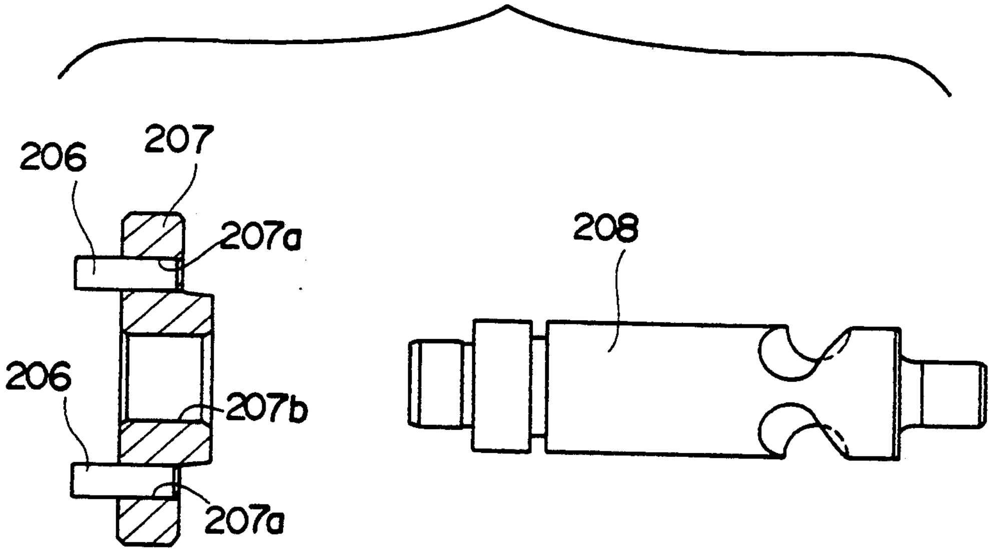
FIG. 13 is a view showing a carrier and a shaft of the third embodiment before assembling.

FIG. 13 represents a third embodiment of a power tool according to this invention, in which a body of the power tool is composed of a casing 201 and an electric motor 202 is disposed in the casing 201 at a rear side portion thereof, lefthand as viewed, as a driving means. A motor shaft 202a extends rightward, i.e. towards the front side of the casing 201, from the motor 202, and a pinion 203 is mounted to the motor shaft 202a. To the pinion 203 are meshed with planetary gears 204, 204 which in turn are meshed with an internal gear 205 secured to the inner wall of the casing 201. The planetary gears 204, 204 are mounted through pins 206, 206 to a carrier member 207 to which a shaft 208 is fitted, as a rotating member, and rotatably supported by a bearing means 209. Thus, a speed reduction mechanism is constituted by the pinion 203, the planetary gears 204, 204, the internal gear 205, the pins 206, 206, the carrier member 207, and the shaft 208 constitutes a part of the rotation transmitting mechanism.

A bit holder 215 for holding a tool is disposed at a portion near the righthand, i.e. front, end of the shaft 208 and supported by a bearing means 214.

A cam groove 208a is formed to the front end portion of the shaft 208. A hammer 211 is mounted to the front end portion of the shaft 208 so that the hammer 211 is always urged rightwardly by a spring member 212 which is also mounted to the shaft 208 at the lefthand portion of the hammer 211. The hammer 211 is provided with a cam groove 211b, and balls such as steel balls 210 are fitted into the cam groove 211b and the cam groove 208a of the shaft 208, thereby coupling the hammer 211 to the shaft 208. A claw piece 211a is disposed at the righthand portion of the hammer 211 so as to be detachably engageable with a claw member 215a of the bit holder 215.

A heat radiating block 216 is disposed righthand portion of the motor 202 and a power control element, not shown, is provided for the heat radiating block 216 for controlling the revolution numbers of the motor 202.

Figure 12:
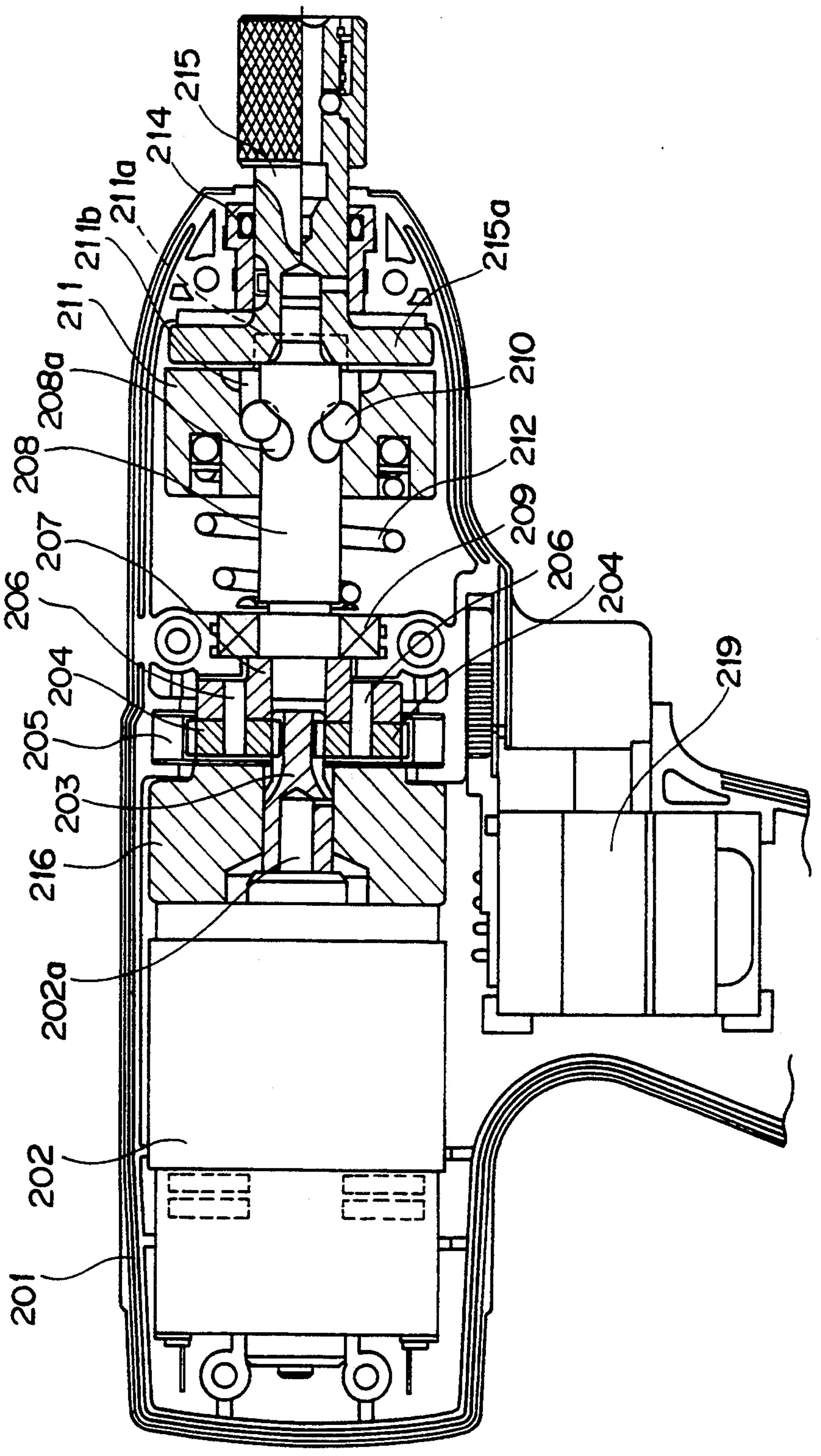
FIG. 12 is a view similar to that of FIG. 1 or 9 representing a third embodiment according to this invention.

The motor 202 is operated by a switch means 219 disposed in the casing 201 at a portion, for example, below the motor as shown in FIG. 12 in an operative association.

In the power tool of the structure described above, a control circuit is accommodated in the switch means 219 and the control circuit transmits a control signal to the electric control element provided for the heat radiating block 216 by turning ON the switch mens 219 and rotating the motor 202. The pinion 203 is then rotated, and in this operation, and the planetary gears 204, 204 are also rotated while revolving by the engagement with the internal gear 205 secured to the inner wall of the casing 201. This rotation of the planetary gears is transmitted to the carrier member 207 and the shaft 208 is hence rotated. In accordance with the rotation of the shaft 208, the hammer 211 is also rotated through the steel balls 210, 210. The hammer 211 is moved leftwardly as viewed in engagement with the cam grooves 211b and 208a upon reaching the predetermined fastening torque, and the engagement between the claw piece 211a and the claw member 215a of the bit holder 215 can be released. At this moment, the spring urging force of the spring 217 increases by the movement of the hammer 218 and the rotating force of the hammer 218 is hence increased, thus moving the hammer 218 rightwardly and striking the claw member 215*a* of the bit holder 215, whereby the bit holder 215 is rotated in a direction for fastening or loosening the screw.

Figure 14:
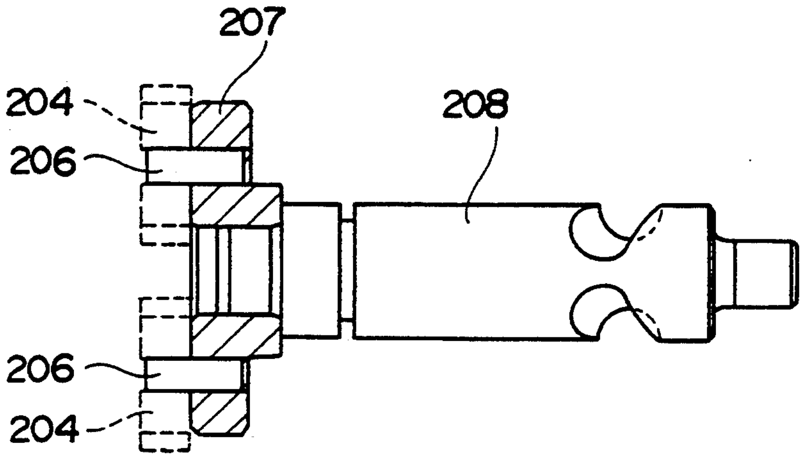
FIG. 14 is a view showing the carrier and the shaft of the third embodiment after assembling.

The assembling of the speed reduction mechanism of the above embodiment will be performed in accordance with the following manner with reference to FIGS. 13 and 14.

First, a shown in FIG. 13, the pins 206, 206 are press fitted into pin holes 207*a*, 207*a* formed to the carrier member 207 and then fastened. Thereafter, the shaft 208 is inserted into the hole 207*b* of the carrier member 207 and then mounted to the pins 206, 206, respectively. Thus, the assembling working can be done easily and precisely.

According to this embodiment, the freedom of attaching position of the planetary gears 204, 204 can be enhanced and a plurality of the planetary gears can be mounted. Furthermore, in case of a plurality of gears can be mounted. Furthermore, in case of a plurality of the planetary gears, the force acting on the gears can be distributed thereto properly, thus elongating life time of the gears. Even in a case where the change of the gearing ratio be needed by changing the motor, this change can be done only by exchanging the carrier member and the shaft can be utilized as it is.

The rotation preventing mechanism described with reference to the first embodiment may be also applied to the heat radiating block of this embodiment.

It is to be understood that this invention is not limited to the described embodiments and other changes or modifications may be made without departing from the scopes of the appended claims. For example, a power tool having combined features of the above mentioned embodiments may attain further improved functions and effects.

What is claimed is:

1. A power tool comprising:

an outer casing;

a rotation drive means disposed in the casing for driving a tool member, said rotation drive means including an electric motor assembly having a housing and a drive shaft extending from the housing to which the tool member is removably attached thereto;

means disposed in the casing for operating the rotation drive means;

a heat radiating block rigidly secured to the electric motor assembly housing, said heat radiating block having a first structure which mates with a complementary second structure on the casing for preventing the motor assembly from rotating relative to the outer casing;

a power control means secured to the heat radiating block for controlling the speed of rotation of the motor drive shaft.

2. A power tool according to claim 1, wherein said first structure comprises a projecting portion integrally formed on the heat radiating block and said second structure comprises an engaging portion formed on an inner wall of the casing so as to be engageable with the projecting portion.

3. A power tool according to claim 1, wherein said first structure comprises a protruded portion formed on an outer peripheral side portion of the heat radiating block and said second structure comprises a recessed portion formed on an inner wall of the casing so as to be engageable with the protruded portion.

4. A power tool according to claim 1, wherein said heat radiating block is rigidly to the rotation drive means by screw means.

5. A power tool according to claim 1, further comprising a speed reduction mechanism operatively connected to the drive shaft and a rotation transmitting mechanism operatively connected to the speed reduction mechanism.

* * * * *